US012361006B1

(12) United States Patent
Brandwine et al.

(10) Patent No.: US 12,361,006 B1
(45) Date of Patent: Jul. 15, 2025

(54) DATA ACCESS TRACKING SERVICE

(71) Applicant: Amazon Technologies, Inc., Seattle, WA (US)

(72) Inventors: Eric Jason Brandwine, Haymarket, VA (US); Jennifer Anne Brinkley, Portland, OR (US); Min Lee Hyun, Lorton, VA (US); Mark Becker, Potomac, MD (US); Ryan Christopher Holland, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/869,373

(22) Filed: May 7, 2020

(51) Int. Cl.
*G06F 16/2455* (2019.01)
*G06F 16/901* (2019.01)
*G06F 21/62* (2013.01)

(52) U.S. Cl.
CPC .... *G06F 16/24553* (2019.01); *G06F 16/9024* (2019.01); *G06F 21/6254* (2013.01)

(58) Field of Classification Search
CPC ........... G06F 16/24553; G06F 16/9024; G06F 21/6254
See application file for complete search history.

(56) References Cited

U.S. PATENT DOCUMENTS

| | | | |
|---|---|---|---|
| 2013/0124322 A1* | 5/2013 | Boland | G06F 7/08 |
| 2015/0249669 A1* | 9/2015 | Gamage | G06F 16/13 |
| | | | 726/26 |
| 2016/0371352 A1* | 12/2016 | Kohlmeier | G06Q 10/10 |
| 2018/0089041 A1* | 3/2018 | Smith | G06F 16/2255 |
| 2018/0165284 A1* | 6/2018 | Mullins | G06F 16/93 |
| 2021/0200901 A1* | 7/2021 | Vemula | G06K 9/6224 |
| 2021/0303713 A1* | 9/2021 | Sreedhar | H04L 9/50 |

FOREIGN PATENT DOCUMENTS

| | | | | |
|---|---|---|---|---|
| CN | 110990878 A | * | 4/2020 | |
| GB | 2508982 A | * | 6/2014 | ........... G06F 16/248 |

* cited by examiner

*Primary Examiner* — Ken Hoang
(74) *Attorney, Agent, or Firm* — Davis Wright Tremaine LLP

(57) ABSTRACT

Systems and techniques are described for tracking and providing access reports for individual pieces of data managed by a data storage service. A service may generate and store a record of operations performed on a piece of data, such that may be classified as containing sensitive or important data, in a data store. The record may link representations of users and the operations performed by those users to instances of the piece of data, as it is found in one or more data objects within the data store. The data store may link other instances of the piece of data and other operations performed on the piece of data to the first instance of the piece of data. The service may access the data store to produce a history record of the various instances of the piece of data and operations performed on those instances of the piece of data.

20 Claims, 8 Drawing Sheets

DATA ACCESS TRACKING SERVICE

BACKGROUND

The generation, use, and storage of data, including sensitive data, such as personal identification information (PII), personal health information (PHI), and financial information, are increasing rapidly. Various cloud platforms and other computing services and technologies enable efficient and controlled access to such data. The sheer volume of data collected and processed make it more difficult to track where the data are located, when data is are accessed, if it is the data are modified, and by whom. As such, it is becoming more and more difficult to protect sensitive data, track where it is stored, respond to customer requests, and identify if there has been unauthorized access to the data.

BRIEF DESCRIPTION OF THE DRAWINGS

Various techniques will be described with reference to the drawings, in which.

DETAILED DESCRIPTION

Figure 1:
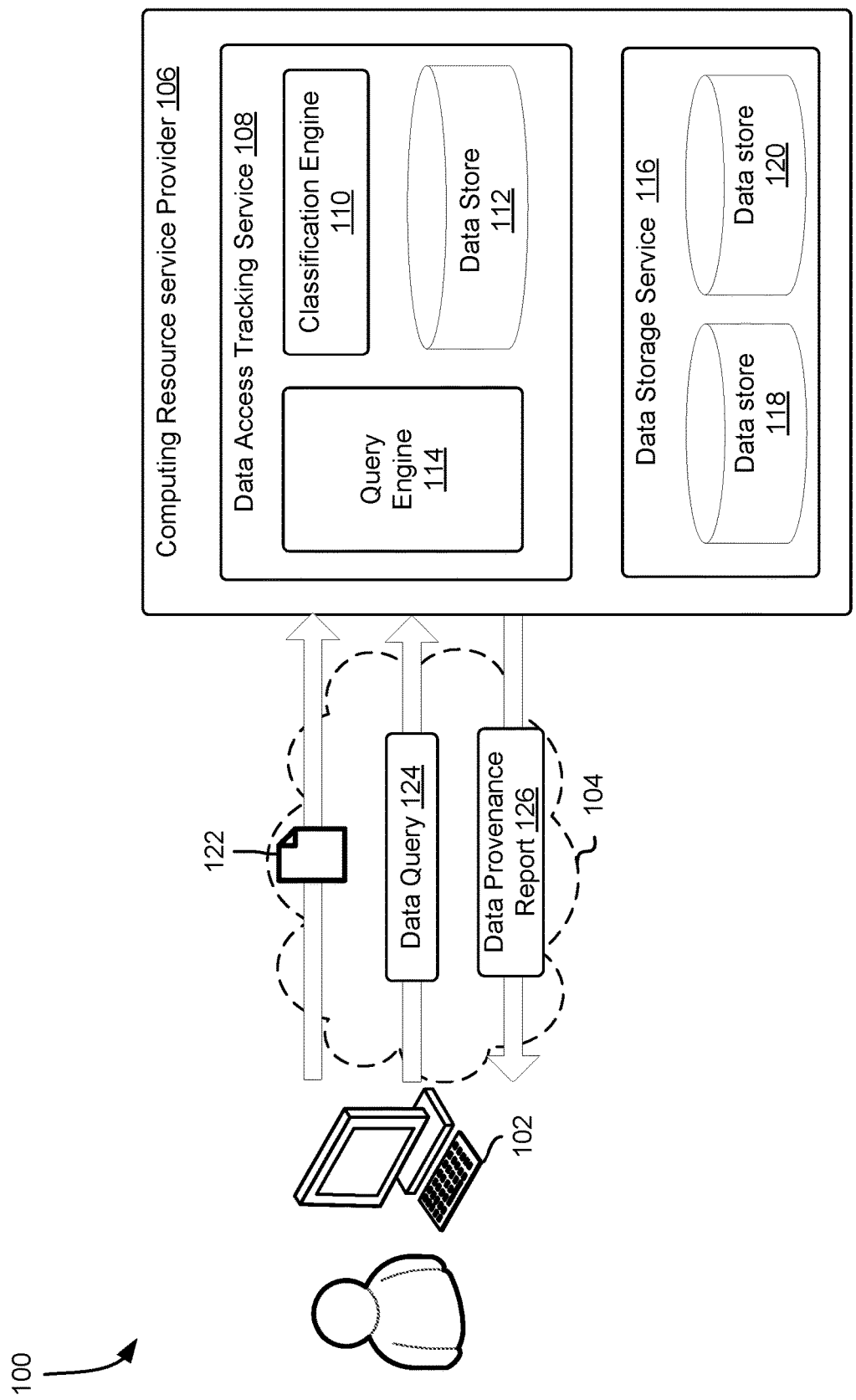
FIG. 1 illustrates an example data access tracking service provided by a computing resource service provider.

The following disclosure describes systems and techniques for tracking and providing a access tracking report for data managed by a data storage service using a data store. A data access tracking system or service may detect occurrences of sensitive data or information in data stored in data storage for a customer, such as one or more databases, logical data containers, etc., managed by a data storage service. The sensitive data detected and identified may be configurable, and may include Personally Identifiable Information (PII), Personal Health Information (PHI), financial information such as credit cards, and the like, or other information. The data access tracking system may store identifiers of the sensitive data in a data store, such as a graph database. The creation and reading of sensitive may also be tracked by monitoring API calls, file system writes, and/or database activity logs of managed data storage. The data access tracking service may link the sensitive data identifiers to indications of operations performed on the sensitive data and by whom to readily track read and write operations performed on sensitive data. The data access tracking system may use the graph database to provide a access tracking report of sensitive data, to enable customers to more readily track and manage sensitive data.

In some aspects, representations of data objects, such as files, tables etc. that include sensitive data, the sensitive data itself, and users may be stored as nodes in the graph database. Various edges may connect the nodes in the graph database to indicate different relationships between the nodes. For example, an edge between a user node and a data object node may indicate that a user represented by the user node created or uploaded the data object represented by the data object node to a managed data store. An edge between an identifier of sensitive data and one or more data object nodes may indicate that the identified sensitive data can be found in the data object(s) represented by the data object node(s). An edge between a user node and a sensitive data node may indicate that the user represented by the user node read or performed some other operation on the sensitive data represented by the sensitive data node. As such, the edges may link various occurrences of sensitive data in different data objects to different users performing different operations on the sensitive data. The data access tracking system may utilize and traverse the graph database to efficiently generate an access tracking report of a certain piece of sensitive data including a detailed history of creation, access and by what users, and different occurrences of the sensitive data in different data objects of a data store.

In some aspects, when the data access tracking system detects that data is being added to the data store in a write operation, the data may be sent to a classification engine or service to determine if sensitive data is present. If no sensitive data is detected, the data may be stored in the data store in the normal course. However, if the classification engine detects one or more occurrences of sensitive data, then a one-way salted hash or other obfuscated identifier of pieces of sensitive data may be created and stored in a graph database, where the graph database defines relationships between the data object (e.g., file, document, database tables, etc.), the user that performed the write operation, and the set of hashes representing the sensitive data that was identified. During data object reads, the system may perform out-of-band lookups to the graph database to determine if the data being read contains sensitive data and if so, the user involve will be added as a reader of the sensitive data hash within the graph database for the data object (e.g., represented by a node with an edge connected to the sensitive data node).

With the data in the graph database, an operator or user can submit queries to the system to determine not only which data objects in the managed data store contain sensitive data generically, but also determine if a specific piece of data exists, who created and who has read any data objects that contain the specified sensitive data, and if users actually interacted with the sensitive data itself.

In some aspects, once sensitive data is detected, the data may be normalized or changed to conform to a format for a specified type of data, to enable better identification of the sensitive data in different data objects. The normalized sensitive data may then be run through any of a variety of obfuscation algorithms to generate a unique identifier of the sensitive data, which can then be stored as a node in the graph database.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) improved tracking of sensitive data in a managed data store; and (2) increased and more efficient access to analysis of interactions with sensitive data in a managed data store, among other benefits and advantages, as will be described throughout the disclosure.

FIG. 1 illustrates an example environment 100 in which a data access tracking service 108 may track and provide access tracking reports for sensitive data managed by a data storage service 116. In some aspects, the data access tracking service 108 and/or a data storage service 116 may be provided as a service by a computing resource service provider 106.

In some examples, the computing resource service provider 106 may be an entity that provides one or more computing resource services to its customers individually or as a combination of services of a distributed computer system. The computing resource service provider 106 may include a collection of physical and/or virtual computing devices and systems, including physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices, including both directional and omni-directional or non-directional media (such as hard drives, optical drives, solid state devices, virtual storage devices such as provided by the computing resource service provider, and the like), services (e.g., such as those accessible via application programming interface calls, web service calls, or other programmatic methods), and the like. Examples of types of computing resources provided by the computing resource service provider 106 include infrastructure-as-a-service (IaaS), platform-as-a-service (PaaS), and/or software-as-a-service (SaaS). The one or more computing resource services of the computing resource service provider 106 may be accessible to users via a network and may include services such as virtual computer system services, block-level data storage services, cryptography services, on-demand data storage services, notification services, authentication services, policy management services, task services and/or other such services. Not all embodiments described include all of the services described, and additional services may be provided in addition to, or as an alternative to, services explicitly described.

Customers of the computing resource service provider 106, such as the customer 102, may communicate with one or more of the services, such as the data access tracking service 108 and the data storage service 116, via an interface, which may be a web services interface or any other type of customer interface over a network 104. Each service provided by a computing resource service provider 106 may have its own interface, and subsets of the services may have corresponding individual interfaces in addition to, or as an alternative to, a common interface. The customer 102 may communicate with the computing resource service provider 106 through a network 104, whereby the network 104 may be a communication network, such as the Internet, an intranet, an internet service provider (ISP) network and/or some other such network. Some communications from the customer device 102 to the data access tracking service 108, as described below, may cause the data access tracking service 108 to operate in accordance with one or more embodiments described or a variation thereof.

Various communications to/from the customer 102 may be orchestrated by a browser or other application executing on the customer 102. In an embodiment, the customer 102 communicates to the data access tracking service 108 or data storage service 116 through one or more application programming interfaces (APIs). In some examples, an application programming interface may be a set of subroutine definitions, communication protocols, and/or software tools that provide a method of communication from the customer 102 and the computing resource service provider 106, the data access tracking service 108, and/or the data storage service 116.

In an embodiment, the customer 102 is any entity operable to access systems such as the data access tracking service 108 and data storage service 116. In some examples, the customer 102 is an individual, group of individuals, business entity or other organization that has a business relationship with the computing resource service provider 106. In the present disclosure, it is contemplated that use of the term "customer" can include a computing device (also referred to as a "client device") used to perform operations under the control of or on behalf of the customer (e.g., to access data access tracking service 108 provided by the computing resource service provider 106). Examples of such a computing device include one or more instances of a physical computing instance (e.g., a physical server computer, a mobile communication device, a laptop computer, a tablet computer, a personal computer, a mainframe, etc.) or one or more instances of a virtual computing instance, such as a customer-accessible virtual machine hosted on one or more computer servers, or other computing system capable of communicating with a service provided by the computing resource service provider. In some examples, a "service" refers to an executing computer application that provides functionality to another computer application.

As illustrated, the data access tracking service 108 may include a collection of physical and/or virtual computing devices, including hardware or software-based storage devices that host or provide a classification engine 110, a query engine 114, and a data store 112. As illustrated, the classification engine, 110, the data store 112 and query engine 114 are part of the data access tracking service 108. However, in other example, one or more of these components may be provided separately by the computing resource service provider 106, and/or an external service or operate on separate computing resources.

The classification engine 110 be any computing resource or collection of such resources capable of interacting with other components of the data access tracking service 108 and computing resource service provider 106, so as to orchestrate and execute classification of various data stored by the data storage service 116 for a customer 102. Examples include physical computing systems (e.g., servers, desktop computers, laptop computers, thin clients, and handheld devices such as smartphones and tablets), virtual computing systems (e.g., as may be provided by the computing resource service provider 106 using one or more resources associated therewith), services (e.g., via application programming interface calls, web service calls, or other programmatic methods), databases (which may be implemented on one or more of the foregoing examples), and the like.

The classification engine 110 may obtain data that is stored in one or more data stores 118, 120 managed by a data a storage service 116 for a customer 102. In some cases, it may obtain the data after it has been stored by the data storage service 116. In other cases, it may intercept data as it is being stored by the data storage service 116, such as from a customer device 102. The classification engine 110 may analyze the data to determine if any sensitive data is contained within the data. The sensitive data may take any of a variety of forms, such as PII, PHI, financial information, and other types of information, which may be configurable by customer 102. The classification engine 110 may search for sensitive data in the data based on characteristics or identifiers of such data using one or more criteria. This may include number strings indicating a credit card number (e.g., 15 or 16-digit numbers that satisfy a Luhn check), data that fits certain formats, such as city, state, zip code, data that satisfies regular expressions whose satisfaction indicates potential sensitive date, and the like. In some aspects, searching the data for sensitive data may utilize known techniques and/or an external service to search the data, such as Amazon Macie or other similar services.

Once the classification engine 110 has identified sensitive data, such as according to one or more rule sets defining what sensitive data includes, it may perform one or more obfuscations on the sensitive data, to generate an identifier of the sensitive data. Obfuscating the sensitive data may help protect the sensitive data from unwanted exposure, unwanted access, and the like. In some aspects, a hash function or other similar function may be performed on the sensitive data to produce an obfuscated identifier of the data. In some aspects, a hash that will cause collisions may be sued in single tenant environments. In other cases, a salted hash function may be used, where each salted hash may be unique to and useful in identifying a user that modified or accessed a sensitive piece of data.

The classification engine 110 may then send the obfuscated identifier of the sensitive data, and metadata of the sensitive data to be stored in data store 112. The metadata may also include an identifier of the data object from which the sensitive data was found. As used herein, a data object may refer to any of a variety of data structures such as a file, document, table, or other data structure utilized in relational, no-relational, table-oriented, and other databases and data storage schemes. The identifier of the data object may be a file or document name, key-value pair from a table, namespace, and so on. The metadata may further include an indication of the user or customer, or customer device (e.g., IP address), of the device responsible for writing the data to the data store 118, 120. In the example of FIG. 1, this would include an identifier of customer or customer device 102. In other cases, the user identifier may also include account information, such as would be associated with a particular data store 118, 120, which may be abstracted from an IP address. The data store 112 may take the sensitive data identifier and other metadata and organize that information collectively into a graph database structure, as will be described in greater detail below.

The data store 112 may be any computing resource or collection of such resources capable of interacting with other components of the data access tracking service 108 and computing resource service provider 106, so as to map relationships between sensitive data, data objects, and users performing operations on the sensitive data and data objects stored by data storage service 116 for customer 102. Examples include physical computing systems (e.g., servers, desktop computers, laptop computers, thin clients, and handheld devices such as smartphones and tablets), virtual computing systems (e.g., as may be provided by the computing resource service provider 106 using one or more resources associated therewith), services (e.g., via application programming interface calls, web service calls, or other programmatic methods), databases (which may be implemented on one or more of the foregoing examples), and the like. In some cases, the data store 112 may be stored in any of a variety of locations, including one or more virtualized computing resources provided by computing resource service provider 106. In some aspects, data store 112 may be stored by the data storage service 116. In some examples, the data store 112 may include a graph database, as will be described in greater detail below. In yet some examples, the data store 112 may include one or more of relational, NOSQL, SQL, hybrid, and other types of databases.

The data store 112 may store the sensitive data identifiers, and identifiers of data objects and users as nodes or objects. The data store may also store edges or associations that link two or more nodes together. The associations or links (e.g., edges in the graph database example) may indicate relationships between the various objects or nodes, such as indicating various operations being performed on an object or node (e.g., reading or writing data). In other cases, a link or edge may indicate that a piece of sensitive data can be found in one or more data objects. A more detailed example of a data store that includes a graph database will be described in greater detail below in reference to FIG. 4. Objects and links (e.g., nodes and edges in the graph database example), as stored in the data store 112, may include various data or metadata indicating what the node or edge represents. For example, nodes may include various identifiers of sensitive data, data objects, and users, whereas edges may include some identifier or indicator of the relationships between the nodes, such as contained in, read operation, write operation, and the like. It should be appreciated that the edges representing relationships between the nodes and the node themselves may be stored in any of a variety of ways, including using tables, key-value pairs, relational and non-relational schemas, and so on. In some cases, other databases or data stores other than a graph database may be utilized to store the same or similar information, preferably maintaining the relationship information between sensitive data or information, data objects, and users.

The query engine 114 may be any computing resource or collection of such resources capable of interacting with other components of the data access tracking service 108 and computing resource service provider 106, so as to parse or traverse the data store 112 to generate access tracking reports on sensitive data stored by the data storage service 116 on behalf of customer 102. Examples include physical computing systems (e.g., servers, desktop computers, laptop computers, thin clients, and handheld devices such as smartphones and tablets), virtual computing systems (e.g., as may be provided by the computing resource service provider 106 using one or more resources associated therewith), services (e.g., via application programming interface calls, web service calls, or other programmatic methods), databases (which may be implemented on one or more of the foregoing examples), and the like.

The query engine 114 may access the data store 112 to generate a data access tracking report of sensitive data stored by the data storage service 116 on behalf of customer 102. In one example, the query engine 114 may receive a query 124 to identify sensitive data stored by the data storage service 116 from customer 102. The query 124 may specify a specific piece of information that a customer desired to obtain a history information/an access tracking report of. The query engine 114 may generate the requested access tracking report by first generating an identifier of the sensitive data indicated in the query 124, according to one or more functions defined and used by the classification engine 110 to construct the graph database in the first instance. In other cases, the query engine may send the sensitive data to the classification engine 110, whereby the classification engine 110 may generate the identifier, and return it to the query engine 114. The query engine 114 may then search for all instances of the sensitive data identifier in the graph database 112. The query engine 114 then compile the information obtained from the data store 112, including when the sensitive data was first stored in a customer data store 118, 120, which users have performed operations on the sensitive data, the operations performed, and in what data objects the sensitive data may be found, to generate a access tracking report of the sensitive data. The query engine may then return the data access tracking report 126 to customer 102.

The data storage service 116 may be an on-demand data storage service, such as an object-based data storage service. The data storage service 116 may be a service provided by a computing resource service provider 106. The data storage service 116 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. The data stored in the data storage service 116 may be organized into data objects and may be stored across different data stores 118, 120, which may be different logical storage containers that are isolated from each other. The data storage service 116 may store numerous data objects of varying sizes. The data storage service 116 may operate as a key value store that associates data objects with identifiers of the data objects which may be used by the customer 102 to retrieve or perform other operations in connection with the data objects stored by the data storage service 116. Access to the data storage service 116 may be through application programming interface (API) calls to the service or via an interface, such as a graphical user interface (GUI).

It should be appreciated the described systems and techniques are equally applicable to other, non-object based data storage systems, such as block data storage, table-oriented data storage, relational databases, and the like. However, for consistency and ease of reference, the described techniques will primarily be described in relation to object-based data storage systems.

In one example, customer or user 102 may add one or more data objects to a customer data store 118, 120 managed by data storage service 116, via an operation 122. This may include performing a write operation to the data store 118, 120. It should be appreciated that the techniques are equally applicable to storing, detecting, and tracking various forms of data, including images, video, audio, and other types of data. The request may go to the data storage service 116, which may store the provided data into an appropriate data store 118, 120, such as configured to store data for customer 102. The data access tracking service 108/classification engine 110 may determine that new data has been stored in the customer data store 118, 120, and may determine if any sensitive data is contained in the newly stored data. If so, the classification engine 110 may store identifiers of the sensitive data and associated metadata in the data store 112. In this way, the data store 112 may be populated out-of-band, without causing delays to the customer 102 in interacting with data store 118, 120. In other cases, the data access tracking service 108, when enabled, may intercept the data write request 122 and determine if the data to be written contains any sensitive data. If so, the data access tracking service 108 may classify the sensitive information and store it and associated metadata in the graph database. In this example, the data access tracking service 108 may forward the data operation 122 to the data storage service 116. In some aspects, this may be done immediately to prevent any delays in the customer interacting with data store 118, 120.

In some aspects, data that is uploaded or imported into the customer data store 108 may be associated with or include origin or provenance information, such as in the form of metadata associated with the data. The origin or provenance information may include one or more of location where the data was first found (e.g., website), organization associated with the location (e.g., news organization), who or what entity originally published the data (e.g., IP address, or other indicator of where the data came from), when the data was first published, and other similar information. In some cases, the origin or provenance information, or an indication thereof, may be stored in the data store 112. In these scenarios, the data access tracking service 108 may access the data store 112 to produce a provenance report of data, such as including for certain pieces of sensitive data, using the origin or provenance information. In some cases, where different versions of the similar data are published (e.g., the web) and/or uploaded to a data storage service 116, each piece of information may be stored as a record, and multiple records may be linked to a single piece of data, such as in the data store 112, so that upon request, the data store 112 may return to the access tracking service 108, all records linked to the piece of data to generate a provenance report of the data. For example, the provenance report may include, in some examples, origin informant as to where the data was first published, when, and by whom, and information concerning if the same or modified versions of the data were published or found in other locations, and relevant information pertaining to those other instances of the data, as well as an access history to the data, as tracked by the computing resource service provider 106. By including origin information, as well as access tracking information, a more complete picture of certain data, access to that data, truthfulness of the data, and/or dissemination of that data may be readily generated and provided.

In another example, the data operation 122 may include a data read operation. In this example, the data storage service 116 may process the read operation and return the requested data to the customer 102. Either during or after the read operation has been performed, the data access tracking service 108 may obtain the read request or an indication thereof. The classification engine 110 may then determine if the data to be read contains any identified sensitive information. If so, the classification engine 110 may store an indication of the read operation, the sensitive data affected, and the user or users requesting the action to be performed in the data store 112. In the request does not affect sensitive data, the classification engine 110 may simply not record any additional information in the data store 112.

In some aspects, the data access tracking system 108 may track what information the customer device 102 accesses, such as by implementing read receipt requests to the device 102. In some cases, a plug-in or other component may be installed on the customer device 102 to track what data is actually viewed on the customer device 102, to more granularly track whether one or more pieces of sensitive data contained in a data object are actually displayed/viewed by the customer device 102.

Figure 2:
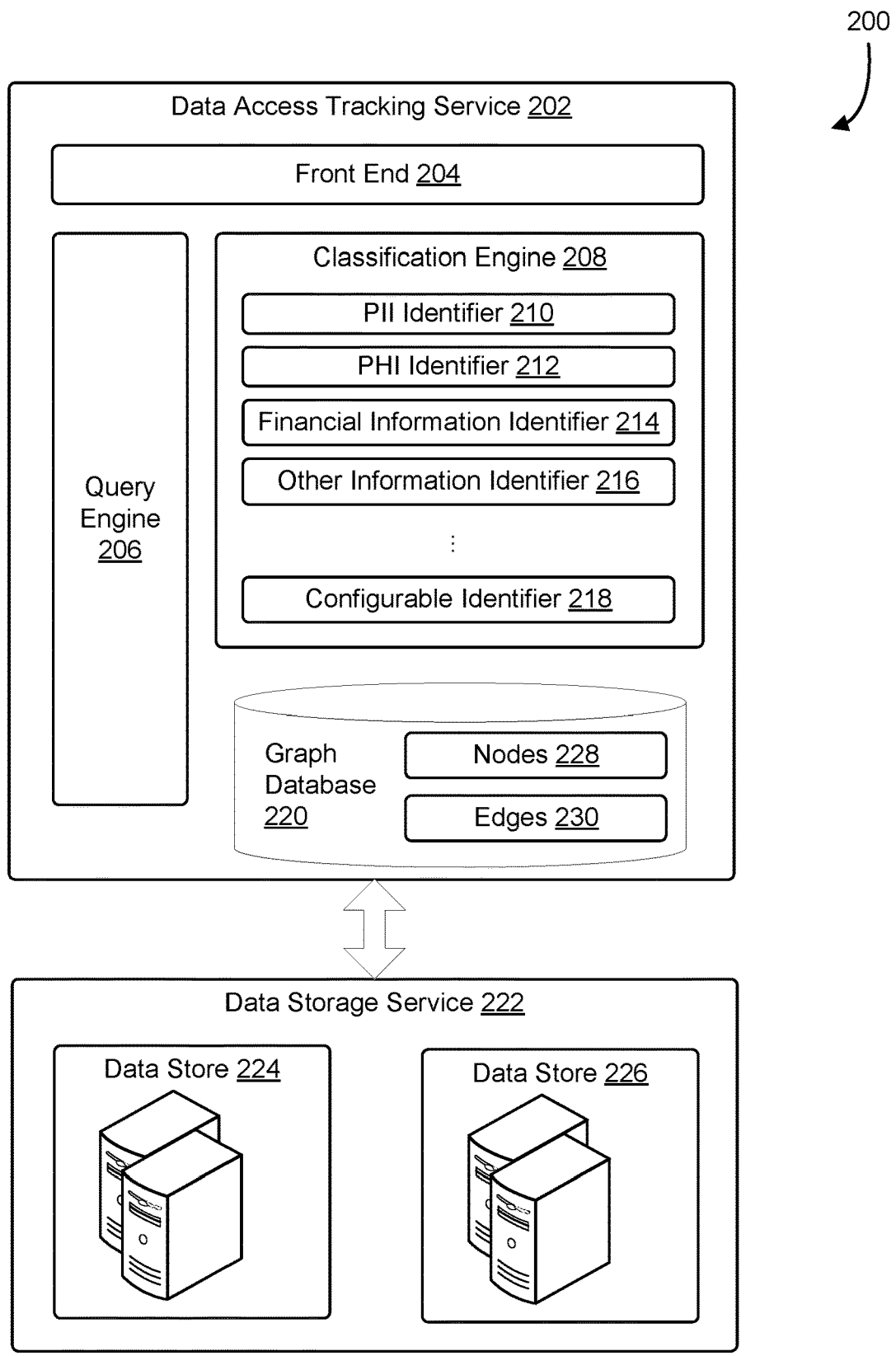
FIG. 2 illustrates a more detailed example of ta data access tracking service in communication with a data storage service.

FIG. 2 illustrates another environment 200 including a data access tracking service 202 in communication with a data storage service 222. The data access tracking service 202 and data storage service 222 may include one or more aspects of similarly named components described above in reference to FIG. 1, and for the sake of brevity, those similar aspects will not be described again here.

In the example of FIG. 2, the data access tracking service 202 includes a front end 204. The front end 204 may be any computing resource or collection of such resources capable of interacting with other components of the data access tracking service 108, such as physical computing systems (e.g., servers, desktop computers, laptop computers, thin clients, and handheld devices such as smartphones and tablets), virtual computing systems (e.g., as may be provided by the computing resource service provider 106 using one or more resources associated therewith), services (e.g., via application programming interface calls, web service calls, or other programmatic methods), and the like. The front end 204 may interface with customers, the classification engine 208, and the data storage service 222 to obtain data for generating and updating the graph database 220. The front end 204 may also interface with the query engine 206 and/or the graph database 220 to obtain queries from customers and instruct the query engine 206 to perform the subsequent searches of the graph database 220.

In some aspects, the front end 204 may maintain customer account information, such as to provide account setup management and log in functions, particularly in multi-tenant scenarios. In some aspects, the front end 204 may be associated with the data storage service 222 or be a stand-alone system. In some cases, the front end 204 may interface with the data storage service 222 to access account information already established and used by the data storage service 222, for example, when configuring one or more customer specific data stores 224, 226.

The classification engine 208 may include a number of criteria or sub processes for identifying different types of specific or sensitive data. For example, the classification engine 208 may include a PII identifier 210, a PHI identifier 212, a financial information identifier 214, other information identifier 216 and one or more configurable identifiers 218. Identifiers 208-218 may utilize machine learning models, predefined rulesets, pattern matching and recognition techniques, etc., to identify instances of certain types of information. The one or more configurable identifiers 218 may be configurable by a specific customer to detect certain pieces of information that may not otherwise fall within another sensitive data category, for a variety of reasons. These reasons may include tracking occurrence of a certain name, object, image, audio clip, etc., in a data store 224, 226 and access to that specific data. In some cases, the configurable identifier 218 may be configured to detect any of a number of types of content of information, including portions of images, video, audio, and other types of data. In one example, images or portions of images, or portions of documents, may be identified for potential copyright violations.

In the example illustrated in FIG. 2, graph database 220 may store various data and metadata for a plurality of nodes 228 and a plurality of edges 230 that define operations performed on sensitive data. In some examples, the graph database 220 may be provided by various providers and/or may be an example of Amazon Web Service's Neptune, Oracle Spatial and Graph, Microsoft SQL server, Dgrapyh, Neo4J, OrientDB, or others Individual nodes of nodes 228 may be associated with an identifier, such as a sensitive data identifier, a data object identifier, or a user identifier. Some or all of the nodes of nodes 228 may also include or be associated with various metadata, such as a time the node was created and/or modified, if the node is the first instance of sensitive data in the data store, information indicating or linking the node to normalization information, in the case that sensitive data has been normalized to a determined format to aid in tracking multiple instances of the sensitive data, and/or other metadata. Individual edges of edges 230 may include or indicate the relationship between two or more nodes. For example, an edge between a node representing a user and a node representing sensitive data may indicate whether a read or write operation was performed on the sensitive data by the user. In some cases, an edge may indicate a time when the operation was performed. In another example, an edge between a data object node and a sensitive data node may indicate that at least one instance of the sensitive data occurs in the data object, and if more than one instance, the number of instances. In some cases, an edge may include other metadata that relates to a data object, a user, or a piece of sensitive data. In some aspects, an edge may define the nodes it is connected to.

As illustrated, when the data access tracking service 202 receives a data query for one or more pieces of sensitive data, the front end 204 may receive the request and send the request to the query engine 206. The query engine 206 may, in response, search for at least one occurrence of sensitive data or information (or an obfuscated identifier thereof) in nodes 228 of the graph database. Upon finding at least one node of nodes 228 representing the sensitive information, the query engine 206 may search for and find all edges of edges 230 that link to or are associated with the sensitive data node. The query engine 206 may then search all connecting nodes of nodes 228 to determine other occurrences of the sensitive information. The query engine 206 may continue to repeat this process until no more instances of the sensitive information can be found. In this way, the query engine 206 may efficiently determine all occurrences of sensitive information and operations performed thereon to generate an access tracking report or history of the sensitive information as tracked in relation to a customer data store.

In some aspects, data storage service 222 may be separate from the data access tracking service 202, such as provided by or hosted on different physical or virtual computing resources, in different geographical locations, and so on.

In some aspects, the criteria used to classify data as sensitive may change over time. In some cases this may include a user or customer modifying the criteria used to classify data as including sensitive data, organizations that govern what constitutes PII, PHI, etc., changing the standard, or for a variety of other reasons. In these scenarios, upon obtaining the new classification information, the front end 204 may coordinate with the classification engine 208 to change, add, or remove certain identifiers. The front end 204 may then instruct the query engine 208 to access the data stored by the data storage service 222 to reclassify certain data as including sensitive data according to the new classification data. In some cases, where operations and other metadata has been stored from past operations performed on the data, those previous operations may also be accessed and reclassified according to the classification information, and stored in the graph database 220. In some aspects, this may include querying and potential modifying nodes 228 and edges 230 stored in the graph database. In these way, the data access tracking service 202 may adapt to changing criteria for identifying sensitive data, and track access to that data accordingly.

Figure 3:
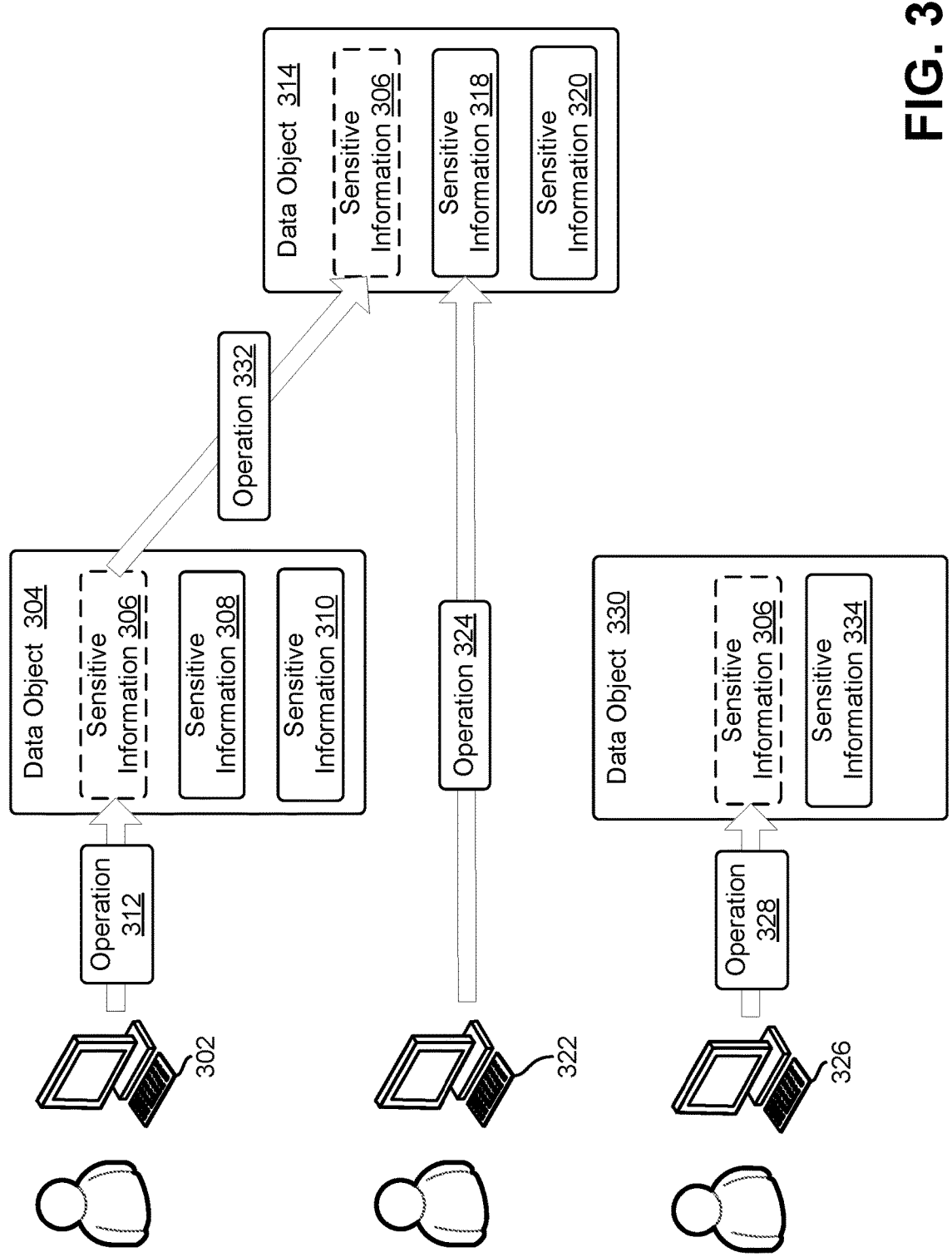
FIG. 3 illustrates an example of various user devices interacting with sensitive data in various data objects.

FIG. 3 illustrates examples 300 of various user devices interacting with sensitive information in various data objects, as may be tracked and captured by the described techniques. Various users 302, 322, 326 may interact with different data objects 304, 314, 330, for example, that may be stored and managed by a data storage service, such as data storage service 116, 222 described above.

In some examples, data objects 304, 314, 330 may be stored in one or more data stores or other logical data containers or partitions linked to a common account, such as an institutional customer, an organization, and the like. In some examples, data objects may be stored in a logical data container or bucket of an on demand data storage service. In other cases, data objects may be stored in, for example, on premise customer data storage. It should be appreciated the described systems and techniques are equally applicable to various types of data storage.

Individual data objects of the data objects 304, 314, 330 may contain pieces of sensitive information 306, 308, 310, 306, 318, 320, 306, and 334, respectively, such as may be identified by a data access tracking service described above. Some of the pieces of sensitive information may overlap or occur in two or more data objects, such as sensitive information 306. In some cases, when multiple users are interacting with various data objects 304, 314, 330, it may be difficult to track and identify all operations performed on sensitive information and all locations where the sensitive information is stored to determine if there is a high likelihood that a data breach has occurred with respect to the sensitive information.

For example, a first user 302 may read a data object 304 and may access or read explicitly sensitive information 306. In some instances, sensitive information 306 may then be moved or copied, such as written to a new location as indicated by operation 332, or may simply occur in another data object 314 without a direct link to data object 304. In another example, a different user 322 may perform on operation 324, such as a write operation, and may add sensitive information 318 to data object 318. In yet another example, a user 326 may access sensitive information 306 from another data object 330.

By tracking not only when users access a certain data object, but when they access identified pieces of sensitive information, a more granular and accurate account of operations performed on the sensitive data may be determined. This may be accomplished by tracking metadata, such as location information, of where pieces of sensitive data occur in a data object, to be able to determine with more specificity, if a user device has actually read/displayed the sensitive information (e.g., via various forms of tracking implemented on the user devices 302, 322, 326). The metadata may include various types of location identifiers, such as work count, line, page number, etc., in a document, row and/or column in a table, and so on. Tracking access to sensitive information at this level may provide much higher confidence on whether the sensitive information is determined to be breached or, for example, exported from the managed data store.

In other examples, access or operations performed on data may be tracked at the data object level, for example to reduce the amount of device tracking needed or to minimize data privacy concerns. In this example, predictive techniques may be utilized to indicate a degree of likelihood that a device has accessed certain pieces of sensitive information in a data object, based on, for example, a time period the data object was accessed for, what type of network used to access the data or a number of other factors. In yet other cases, simple operations on data objects may be used to infer access to sensitive information contained in the data objects (e.g., access to the data object would indicate access to all sensitive information in the data object).

In the example provided, access to sensitive information 306 by user/device 302, occurrence of the sensitive data 306 in data object 314, and the access of sensitive information 306 in data object 306 may all be readily compiled by traversing a graph database that indicates the various relationships between instances of the sensitive information 306, the various users accessing it, and the data objects in which the sensitive information can be found.

Figure 4:
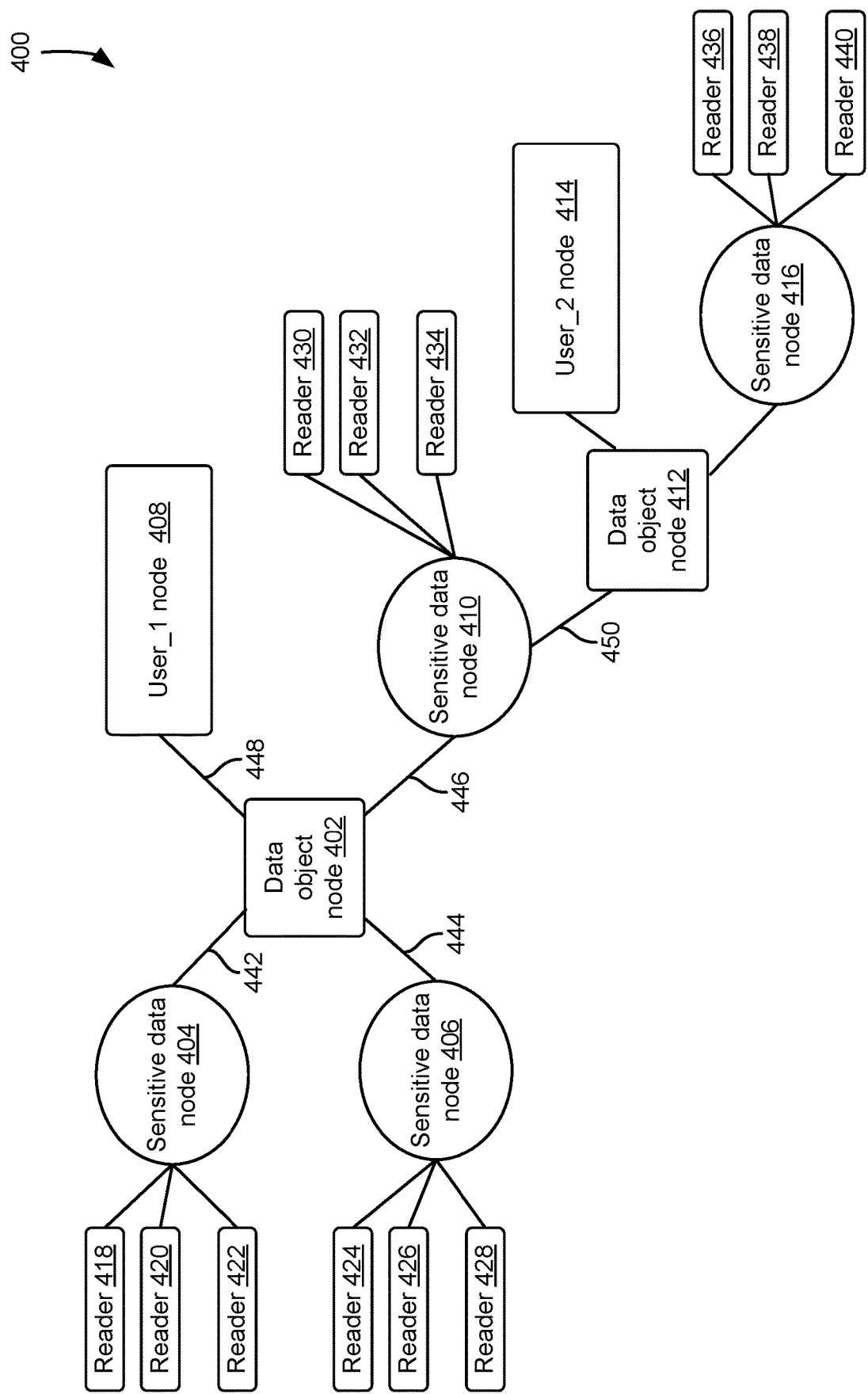
FIG. 4 illustrate an example of a graph database, which may be used by a data access tracking service.

FIG. 4 illustrate an example of a graph database 400, which may be used by a data access tracking service to track sensitive data in a managed data store. Graph database 400 may be an example of data store 112 and/or graph database 220, and/or may incorporate one or more aspects of these databases. As illustrated, graph database 400 may include two nodes 402, 412 that represent data objects. In some cases, nodes 402, 412 may be associated with identifiers of, and not the underlying data object.

Data object node 402 may be linked or associated with sensitive data nodes 404, 406, and 410 via edges 442, 444, 446, where the edges 442, 444, 446 indicate that the data object represented by data object node 402 contains sensitive information represented by sensitive data nodes 404, 406, and 408. Data object node 402 may also be linked or associated with user node 408 via edge 448, indicating that data object 402 was created or uploaded by User_1 represented by user node 408. Sensitive data nodes 404, 406, 410 may be linked or associated with various user nodes or reader nodes 418-434 that indicate that various user devices have read the underlying sensitive information represented by the sensitive data nodes 404, 406, 408 (the numbering for the various edges connecting the readers to the sensitive data nodes have been omitted for clarity). In some aspect, sensitive information, such as represented by node 410, may be found in two or more data objects, as represented by edge 446 to data object node 402 and edge 450 to data object node 412. The data object represented by data object node 412 may also contain sensitive information represented by sensitive data node 416 linked by edge 452 and may have been created by User_2, represented by user node 414 connected by edge 454. Sensitive data node 416 may be similarly connected to various user or reader nodes 436, 438, 440 (edge numbering omitted for clarity).

It should be appreciated that in some instances different information or metadata may be associated with different nodes or edges. In some cases, a node may be defined in such as a way as to reduce or eliminate other data that needs to be associated with an edge to accurately define the relationships between user nodes, data object nodes, and sensitive data nodes. For example, a subset of user nodes may be defined as reader nodes, such as to indicate that a user performed a read operation on a connected node. This may negate the need to define the operation in metadata associated with the corresponding edge. It should be appreciated that various other conventions may be utilized to a similar effect, and may be more useful in defining or represent certain relationships that may repeat across a data set.

Figure 5:
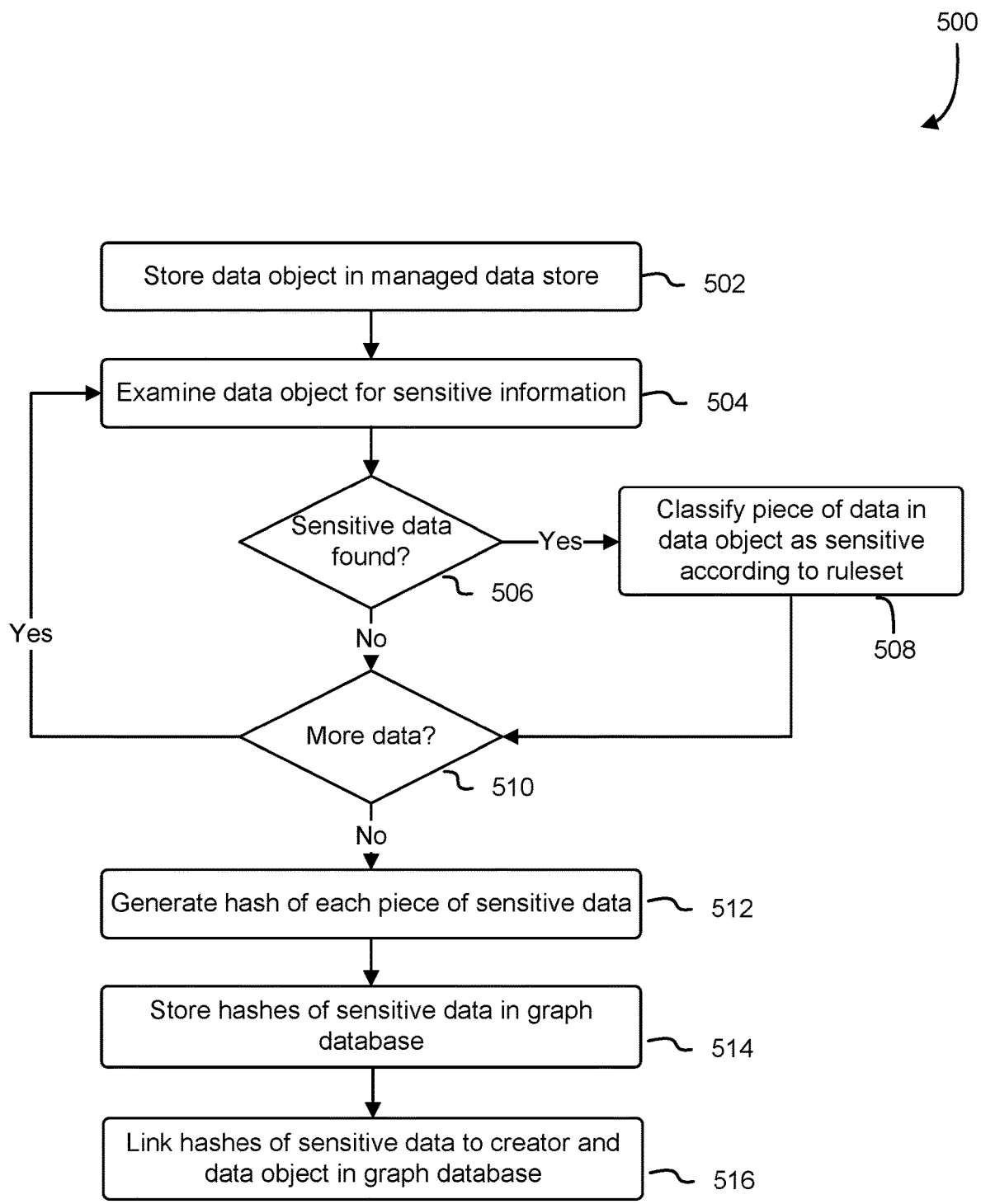
FIG. 5 illustrates an example process for storing identifiers of data in a graph database.

FIG. 5 illustrates an example process 500 for storing identifiers of data in a graph database. In some examples, process 500 may be performed by one or more of the data access tracking service 108, 202, front end 204, classification engine 110, 208, and/or data store 112 or graph database 220 described in reference to FIGS. 1 and 2 above.

Process 500 may begin at operation 502, in which a data object may be obtained, for example, by a data access tracking service. In some cases, the data object may be obtained from a data store, such as managed by a data storage service. In other cases, the data object may be obtained from a customer or user device submitting the data object to be stored. Next, at operation 504, the data object may be examined for occurrences of sensitive information. Operation 504 may be performed by a classification engine, and may include searching for a number of different types or indicators of various forms on sensitive information.

If sensitive information is found, at operation 506, process 500 may proceed to operation 508, where the piece of data may be classified as sensitive information according to a predefined ruleset defining what constitutes sensitive information. In some cases, a type of the sensitive information may also be identified at operation 508, such as PII, PHI, financial information, or other identifiers based on a content of the data. Process 500 may then proceed to operation 510, where it may be determined if there is more data of the data object to search. If so, process 504 may continue to loop through operations 504, 506 and 508 until no more sensitive data is found, at operation 506, or until no more data is left to be searched at operation 510. If the determination to both of those inquires is no, process 500 may proceed to operation 512, where a hash may be generated for identified pieces of sensitive information or data. In some aspects, operation 512 may include generating a hash of the sensitive data, or some other obfuscated (or un-obfuscated) identifier of the sensitive data. In some cases, operation 512 may additionally include either hashing an identifier of the type of sensitive information or appending an un-hashed or un-obfuscated identifier of the type of sensitive information. In some aspects, a salted has function or similar function may be used to identify which users or accounts accessed a certain sensitive piece of data.

At operation 514, the hash or other obfuscated identifier of the sensitive information may be sent/stored in a graph database. In some cases, where type information is also generated, the type information may also be stored/associated with the sensitive information. In some aspects, indicators of the sensitive information may be stored as separate nodes, and in some cases, with type information and/or other metadata, such as creation or upload time, etc. Next, at operation 516 the hashes or nodes representing the sensitive information may be linked or associated with an indicator of the creator or uploader of the data object, in the graph database. In some cases, the link or association may be represented by an edge, with its own identifier and, in some cases, additional metadata.

Figure 6:
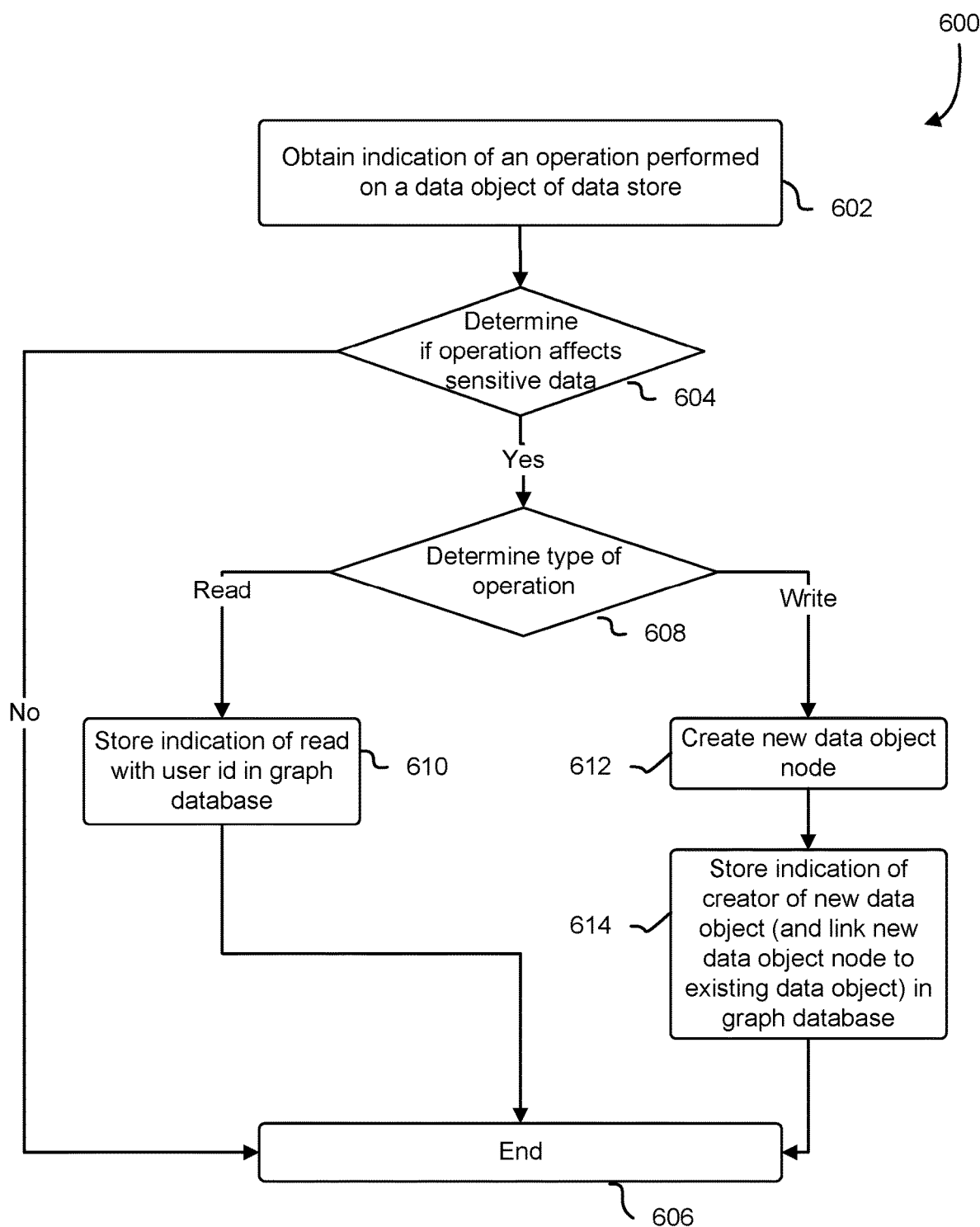
FIG. 6 illustrates an example process for updating a graph database responsive to operations being performed on data tracked by the graph database.

FIG. 6 illustrates an example process 600 for updating a graph database responsive to operations being performed on data tracked by the graph database. In some examples, process 600 may be performed by one or more of the data access tracking service 108, 202, front end 204, classification engine 110, 208, data store 112 or graph database 220, and/or data storage service 116, 222 described in reference to FIGS. 1 and 2 above.

Process 600 may begin at operation 602, in which an indication of an operation being performed on a data object of a data store may be received or obtained. In some aspects, operation 602 may be performed by a data access tracking service and/or front end component thereof. Next, at operation 604, it may be determined if the operation affects or impacts sensitive information. In some cases, operation 604 may include searching through the data object itself to identify sensitive information or an identifier of sensitive information, in the case the data object has already been classified by the data access tracking service. If the data object does not contain sensitive information, process 600 may end at 606. If the operation does affect sensitive information, process 600 may proceed to operation 608, where it may be determined what type of operation was performed on the data. If a read operation is determined, an indication of the read operation with an identification of the user/user device performing the operation may be stored in the graph database, at operation 610. In some aspects, operation 610 may include adding/storing a reader node to the graph, with identification information of the user device that performed the operation. In other cases, operation 610 may include creating a user node and linking it with an edge to the existing sensitive data node representing the sensitive information affected by the operation. In some cases, if a user node representing the user device that performed the operation already exists in the graph database, operation 610 may include adding an edge between the existing user node and the existing sensitive data node. Process 600 may then end, at 606.

If, at operation 608, a write operation is determined, process 600 may proceed to operation 612, in which a new data object node may be created in the graph database to represent the data object being written to or uploaded to the data store. Next, an indication of the creator of the data object may be stored in the graph database, for example, as a user node and linked by an edge to the new data object node. If the creator already is represented in the graph database, the new data object node may be connected by an edge to the existing user node. In the example that the new data object was created from an existing data object (e.g., as modified from the existing data object), the new data object node may be linked to the existing node represented the original data object. Process 600 may then end, at 606.

Figure 7:
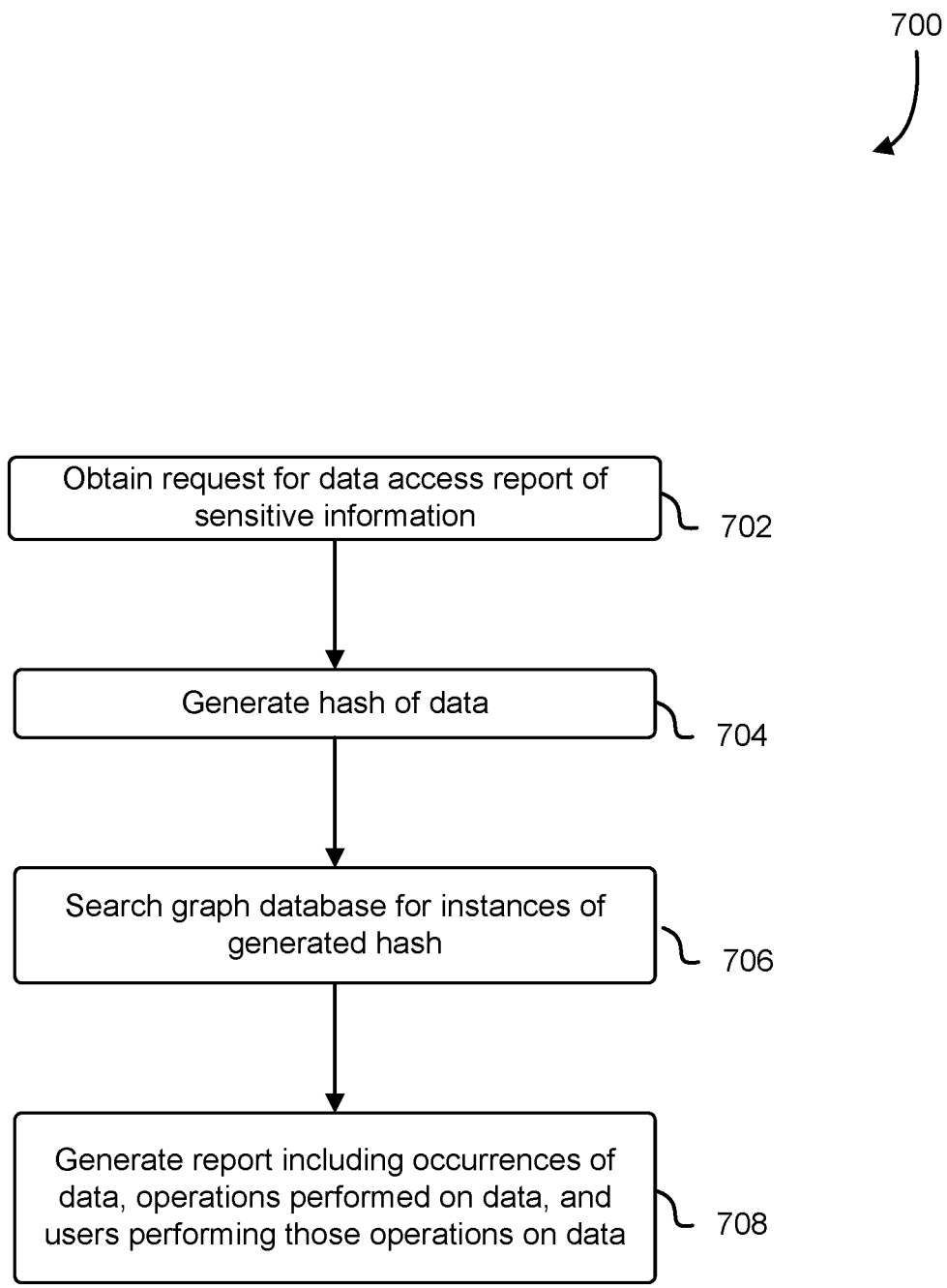
FIG. 7 illustrates an example process for generating a access tracking record for data using a graph database.

FIG. 7 illustrates an example process 700 for generating an access tracking record for data using a graph database. In some examples, process 700 may be performed by one or more of the data access tracking service 108, 202, front end 204, classification engine 110, 208, data store 112 or graph database 220, and/or query engine 114, 206 described in reference to FIGS. 1 and 2 above.

Process 700 may begin at operation 702, in which a request for a access tracking report or history of one or more pieces of sensitive information may be obtained, such as by a data access tracking service/query engine. Next, at operation 704, a hash (or other identifier) of the sensitive information may be generated. In some cases, operation 704 may include utilizing the same algorithm used to generate the sensitive information identifiers used to initially store the sensitive information in the graph database, such as used by the classification engine.

Next, at operation 706, the graph database may be searched for instances of the generated hash or other identifier of the sensitive information. In some aspects, operation 706 may include determining one or more instances of the sensitive information identifier as nodes in the graph database. All edges from the identified nodes may then be followed from those nodes until no other nodes are identified that are linked to the sensitive data node or nodes. In some cases, all nodes including the sensitive information identifier may first be determined. In other examples, only one need be identified, and then edges followed until no other instances of the sensitive information identifier can be found in the graph database.

At operation 708, an access tracking report may be generated based on the identified nodes and edges in the graph database including or linking to the sensitive information identifier. In some cases, the access tracking report may include a list of user identifications associated with reading or writing to the sensitive information, data objects where the sensitive information can be found, a timeline of operations performed on the sensitive information, and the actual operations performed.

Figure 8:
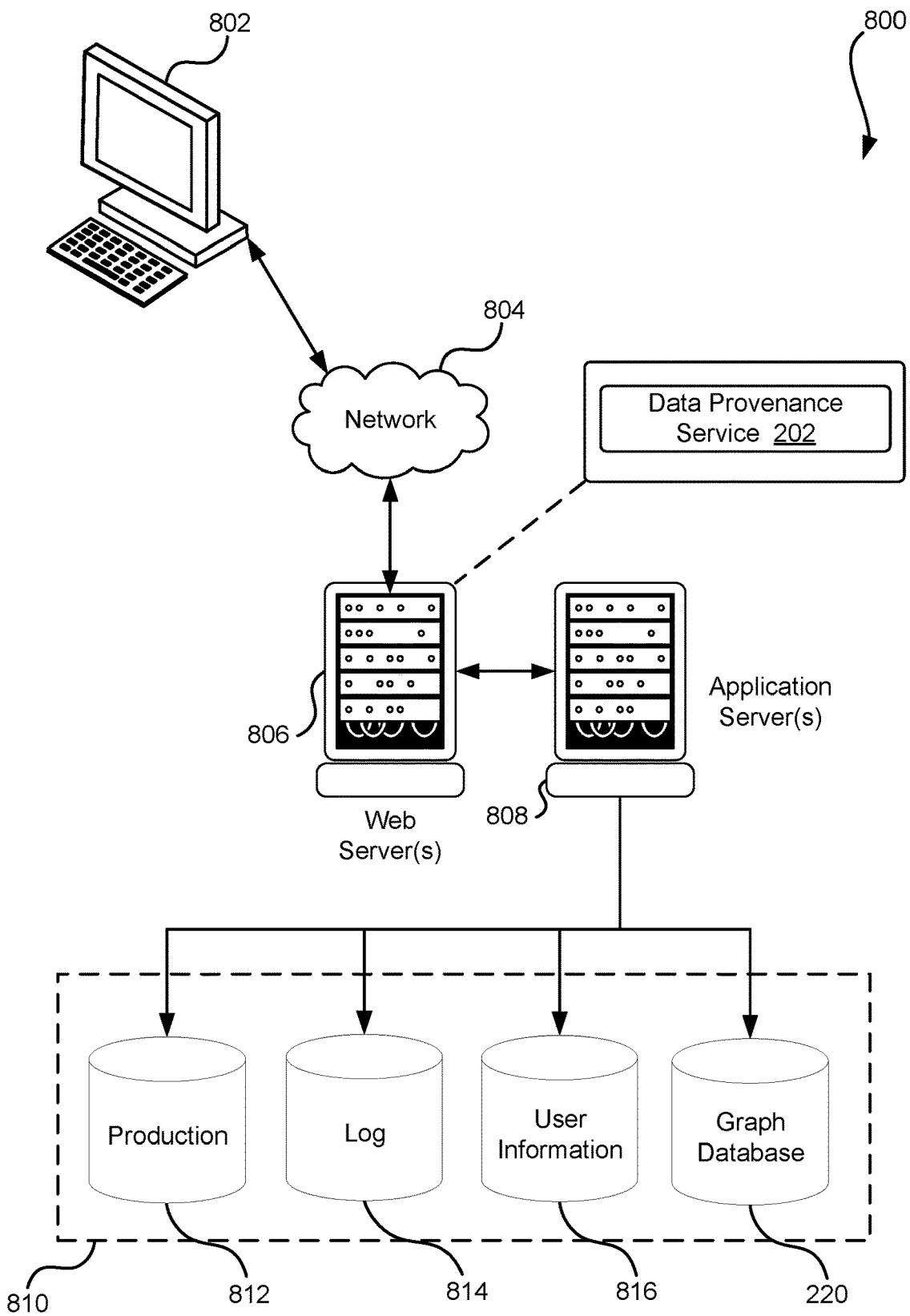
FIG. 8 illustrates an environment in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate structured language in this example. In an embodiment, operations described herein as being performed by a single device are performed collectively by multiple devices that form a distributed and/or virtual system.

As described herein, client device 802 may perform operations on data objects stored by a data store 810. In some aspects, the web server 806 may host and provide a data access tracking service, such as service 202 described above, which may include or interact with web servers 1006, and data store 810 to track and provide access tracking reports with respect to sensitive information stored in one or more data objects of the data store 810.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as function image information and access rights information (e.g., access control policies or other encodings of permissions) are stored in the data store in any of the above listed mechanisms as appropriate or in additional mechanisms in the data store 810.

In some aspects, the data store 810 may host or provide various repositories for use by web server 806 and application server 808 hosting the data access tracking service. In some aspects, data store 810 may store a graph database 220, as described above, which may be used by the data access tracking service, 202 to track and provide access tracking reports of sensitive information stored in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system for providing a provenance report for pieces of data, the system comprising:
   one or more processors; and
   memory that stores computer-executable instructions that, as a result of being executed, cause the one or more processors to:
   generate a graph that stores and represents relationships between pieces of data, data objects in which the pieces of data are located, and users that access the pieces of data in a graph database, wherein the graph stores data comprising:
      a plurality of data object nodes individually representing respective data objects;
      a plurality of data nodes individually representing respective pieces of the data classified as sensitive, wherein the plurality of data nodes store obfuscated identifiers of the respective pieces of data without storing the respective pieces of data in the graph database;
      a plurality of user nodes individually representing respective users;
      a plurality of edges, wherein the plurality of edges maintain a record of access by a first user of a first sensitive piece of data from a first data object without storing the first piece of sensitive data, wherein:
         a first edge between a first data object node and a first data node indicates that the first piece of sensitive data represented by the first data node is in the first data object represented by the first data object node, wherein the first sensitive piece of data is represented in the graph by a first obfuscated identifier; and
         a second edge between the first data node and a first user node indicates that a first user represented by the first user node performed a read operation on the first piece of data, wherein the first piece of data is contained within at least two data objects represented by the first data object node and a second data object node, wherein the second data object node is connected by a third edge to the first data node;
   obtain a query requesting access tracking of the first data; and
   generate a response to the query by traversing at least the first edge, second edge, and third edge of the graph to determine a plurality of users that performed a read operation on the first piece of data by accessing the first data object and the second data object by searching for the first obfuscated identifier, wherein the response to the query comprises a provenance report of the first piece of data.

2. The system of claim 1, wherein:
   a fourth edge between the first data object node and the first user node in the graph database indicates that the first user represented by the first user node created the first data object; and
   obtaining the response to the query further causes the one or more processors to: traverse the graph beginning at the first data object node to determine a plurality of data objects the first piece of data is in and the plurality of users that performed a read operation on the first piece of data.

3. The system of claim 1, wherein the graph database maps access of data stored and managed by a data storage service.

4. The system of claim 3, wherein the instructions that, as a result of being executed, further cause the one or more processors to:
   modify the first piece of data to conform to a predetermined format specific to a type of the first piece of data to produce normalized data; and generate an obfuscated first identifier of the normalized data, wherein the first data node is identified by the obfuscated first identifier.

5. A computer-implemented method for providing a history report of a piece of data, comprising:
obtaining an indication that an operation on a piece of data maintained by a data storage service has been performed responsive to a request from a first user, wherein the piece of data is associated with classification data indicating the piece of data comprises sensitive data;
generating a record of the operation performed on a first instance of the piece of data associated with a first data object in a data store based on the classification data, the record linking representations of the first user and the operation to the first instance of the piece of data within the data store with a plurality of connections, wherein the piece of data is represented in the record via a first obfuscated identifier, the data store further linking other instances of the piece of data in other data objects and other operations performed on the other instances of the piece of data to the first instance of the piece of data, wherein the plurality of connections maintain a record of access by the first user of the first instance of the piece of data from the first data object without storing the sensitive data; and
responsive to obtaining a request for a history of the piece of data, accessing the data store to produce a history record of the piece of data including the first instance of the piece of data, the other instances of the piece of data, and indications of the operation and the other operations performed on the first instance of the piece of data and the other instances of the piece of data by searching the data store for the first obfuscated identifier.

6. The computer-implemented method of claim 5, wherein the data store further comprises:
a first plurality of objects representing a plurality of instances of pieces of data;
a second plurality of objects representing a plurality of users; and
links between the first plurality of objects and the second plurality of objects representing operations performed on the plurality of instances of the pieces of data represented by the first plurality of objects.

7. The computer-implemented method of claim 6, wherein producing the history of the piece of data based on the data store further comprises:
determining a first set of the first plurality of objects that represent instances of the piece of data; and
determining a second set of the second plurality of objects that are linked to the first set of the first plurality of objects that represent users who have performed operations on the instances of the piece of data.

8. The computer-implemented method of claim 5, further comprising:
normalizing the piece of data to produce a normalized piece of data; and
generating an identifier of the piece of data based on the normalized piece of data, wherein the record of the operation performed on the first instance of the piece of data in the data store includes the identifier of the piece of data.

9. The computer-implemented method of claim 8, wherein generating the identifier of the piece of data based on the normalized piece of data further comprises generating a hash of the normalized piece of data.

10. The computer-implemented method of claim 5, further comprising:
classifying the piece of data as including sensitive data; and
associating classification data indicating that the piece of data includes sensitive data with the piece of data in the data store.

11. The computer-implemented method of claim 10, wherein classifying the piece of data as including sensitive data is based on criteria provided by a second user.

12. The computer-implemented method of claim 10, further comprising:
obtaining new classification data, the new classification data indicating a new criteria for identifying pieces of data that include sensitive data; and
associating a second piece of data with classification data indicating the second piece of data contains sensitive data based on the new classification data; and
responsive to obtaining a request for a history of the second piece of data, accessing the data store to produce a history record of the second piece of data.

13. The computer-implemented method of claim 5, further comprising:
obtaining a second indication that an operation on the piece of data maintained by a second data storage service has been performed responsive to a second request from the first user or a second user; and
wherein accessing the data store to produce the history record of the piece of data further comprises producing a history record of the piece of data including the first instance of the piece of data, the other instances of the piece of data, and indications of the operation and the other operations performed on the first instance of the piece of data and the other instances of the piece of data in both the data store and the second data store.

14. A non-transitory computer-readable storage medium storing thereon executable instructions that, as a result of being executed by one or more processors of a computer system, cause the computer system to at least:
obtain, by a data access tracking service, a request for an access tracking report of specific data stored in a data store, wherein the specific data is part of at least two data objects;
determine, by the data access tracking service, an obfuscated identifier associated with the specific data;
search a graph database, maintained by the data access tracking service, for the obfuscated identifier of the specific data, the graph database comprising:
a first plurality of nodes representing a plurality of pieces of data;
a second plurality of nodes representing a plurality of user devices; and
a first set of edges between the first plurality of nodes and the second plurality of nodes representing operations performed on the plurality of pieces of data, wherein the first and second plurality of edges maintain a record of access by the plurality of user devices of the specific data from the at least two data objects without storing the specific data; and
generate the access tracking report of the specific data by compiling a first set of nodes of the first plurality of nodes associated with the obfuscated identifier of the specific data and a second set of nodes of the second plurality of nodes connected to the first set of nodes by the first set of edges.

15. The non-transitory computer-readable storage medium of claim 14, wherein the obfuscated identifier of the specific data is associated with metadata indicating a type of data contained within the specific data.

16. The non-transitory computer-readable storage medium of claim 14, wherein the specific data is associated with metadata indicating that the data object satisfies a sensitive data criteria.

17. The non-transitory computer-readable storage medium of claim 14, wherein the instructions that, as a result of being executed by the one or more processors, further cause the computer system to: normalize the specific data to produce normalized specific data, wherein the identifier is determined based on the normalized specific data.

18. The non-transitory computer-readable storage medium of claim 14, wherein the specific data is associated with different data objects in the graph database, and wherein generating the access tracking record of the specific data further comprises identifying the different data objects in the graph database.

19. The non-transitory computer-readable storage medium of claim 14, wherein generating the access tracking record of the specific data further comprises compiling operations performed on the first set of nodes indicated by the first set of edges.

20. The non-transitory computer-readable storage medium of claim 14, wherein determining the obfuscated identifier associated with the specific data further comprises generating a hash of the specific data.

\* \* \* \* \*